US006882094B2

(12) United States Patent
Dimitrijevic et al.

(10) Patent No.: US 6,882,094 B2
(45) Date of Patent: Apr. 19, 2005

(54) DIAMOND/DIAMOND-LIKE CARBON COATED NANOTUBE STRUCTURES FOR EFFICIENT ELECTRON FIELD EMISSION

(75) Inventors: Steven Dimitrijevic, Tucson, AZ (US); James C. Withers, Tucson, AZ (US); Raouf O. Loutfy, Tucson, AZ (US)

(73) Assignee: Fullerene International Corporation, Dover, DE (US)

( * ) Notice: Subject to any disclaimer, the term of this patent is extended or adjusted under 35 U.S.C. 154(b) by 470 days.

(21) Appl. No.: 09/784,910

(22) Filed: Feb. 16, 2001

(65) Prior Publication Data

US 2001/0024078 A1 Sep. 27, 2001

Related U.S. Application Data

(60) Provisional application No. 60/182,834, filed on Feb. 16, 2000.

(51) Int. Cl.[7] .............................. H01J 1/14; H01J 1/146; H01J 9/00; H01J 9/04; H01J 19/06
(52) U.S. Cl. .................. 313/346 R; 313/309; 313/310; 313/311; 313/351; 313/336; 445/50; 445/51
(58) Field of Search .............................. 445/24, 49, 50, 445/51; 313/309, 310, 311, 336, 351, 346 R; 427/77, 78

(56) References Cited

U.S. PATENT DOCUMENTS

| | | | | |
|---|---|---|---|---|
| 5,129,850 A | * | 7/1992 | Kane et al. | 445/50 |
| 5,180,951 A | | 1/1993 | Dworsky et al. | 313/311 |
| 5,583,393 A | * | 12/1996 | Jones | 313/351 |
| 5,591,312 A | * | 1/1997 | Smalley | 204/157.41 |
| 5,825,122 A | * | 10/1998 | Givargizov et al. | 313/336 |
| 6,097,138 A | | 8/2000 | Nakamoto | 313/309 |
| 6,183,714 B1 | * | 2/2001 | Smalley et al. | 428/367 |
| 6,286,226 B1 | * | 9/2001 | Jin | 33/706 |
| 6,297,592 B1 | * | 10/2001 | Goren et al. | 313/45 |
| 6,383,923 B1 | * | 5/2002 | Brown et al. | 438/666 |
| 6,504,292 B1 | * | 1/2003 | Choi et al. | 313/309 |

FOREIGN PATENT DOCUMENTS

| | | |
|---|---|---|
| DE | 199 10 156 A1 | 9/2000 |
| EP | 0 913 508 A2 | 5/1999 |
| EP | 947466 A1 * 10/1999 | ........... C01B/31/02 |
| EP | 1 061 544 A1 | 12/2000 |
| WO | WO 95/22168 | 8/1995 |
| WO | WO 99/60597 | 11/1999 |
| WO | WO 01/03158 A1 | 1/2001 |

OTHER PUBLICATIONS

Chernozatonskii L.A., et al. "Electron field emission from nanofilament carbon films", *Chemical Physics Letters*, 233: 63–68, (1995) (02/95).

Wei B., et al. "The Mechanism Of Phase Transformation From Carbon Nanotube To Diamond", *Carbon*, 36: 997–1001 (1998), no month.

Xu X., et al. "A method for fabricating large–area, patterned, carbon nanotube field emitters", *Applied Physics Letters, American Institute of Physics* 74: 2549–2551 (1999), no month.

Dimitrijevic S., et al. "Electron emission from films of carbon nanotubes and ta–C coated nanotubes", *Applied Physics Letters* 75(17) 2680–2682, (1999) (10/99).

Search Report.

* cited by examiner

*Primary Examiner*—Ashok Patel
*Assistant Examiner*—Mariceli Santiago
(74) *Attorney, Agent, or Firm*—Scully, Scott Murphy & Presser

(57) ABSTRACT

The present invention is directed to a nanotube coated with diamond or diamond-like carbon, a field emitter cathode comprising same, and a field emitter comprising the cathode. It is also directed to a method of preventing the evaporation of carbon from a field emitter comprising a cathode comprised of nanotubes by coating the nanotube with diamond or diamond-like carbon. In another aspect, the present invention is directed to a method of preventing the evaporation of carbon from an electron field emitter comprising a cathode comprised of nanotubes, which method comprises coating the nanotubes with diamond or diamond-like carbon.

50 Claims, 8 Drawing Sheets

DIAMOND/DIAMOND-LIKE CARBON COATED NANOTUBE STRUCTURES FOR EFFICIENT ELECTRON FIELD EMISSION

RELATED APPLICATION

This application is claiming benefit from U.S. Provisional Application No. 60/182,834 filed on Feb. 16, 2000.

GOVERNMENT SPONSORSHIP

This invention was support in part by a NASA Phase I SBIR Contract No. NAS 9-99040. The United States government may have certain rights in the invention.

FIELD OF THE INVENTION

This invention relates to diamond coated nanotubes and diamond-like coatings of nanotubes and their use in electron field emitters, e.g., flat panel displays, CRT and multiple CRT displays and the like.

BACKGROUND OF THE INVENTION

Field emission electron sources, often referred to as field emission materials or field emitters, can be used in a variety of electronic applications, e.g., vacuum electronic devices, flat panel computers, television displays, emission gate amplifiers, klystrons, vacuum microelectronics application, and the like.

Field emission displays (FED) are a promising challenge to the liquid crystal displays (LCD) currently used for most flat panel electronic displays. Compared to LCD's, FED's are three times brighter, half as thick, have almost twice the viewing angle, one fourth the power consumption and more than twice the thermal operating range. Field emitters are in their incipient stages of development and as such there are many problems associated therewith.

Some contemporary field emitters have etched silicon or silicon microtips; however, these require expensive and elaborate fabrication techniques. Additionally, such field emission cathodes suffer from relatively short lifetimes due to erosion of the emission surface from positive ion bombardment.

Contemporary field emitters with sharp miniature tips made of metals or semiconductors have reasonably good properties necessary for practical applications, but due to their relatively high work functions, high operating voltages and high electrode temperatures are required. Such working conditions increase the risk of surface damage and unstable operation of the device. Thus, an improved field emitter device and any process which reduces the complexity of fabricating field emitters is clearly useful. In order to overcome the aforementioned problems, an important research activity was undertaken towards development of materials and coatings suitable for cold cathodes capable of performing the emission of high current density under relatively weak field. As described hereinbelow, the present inventors have found a solution thereto.

The present invention can be better appreciated with an understanding of the related physics. General electric emission can be analogized to the ionization of a free atom. Prior to ionization, the energy of the electrons in an atom is lower than electrons at rest in a vacuum. In order to ionize the atom, energy must be supplied to the electrons in the atom. That is, the atom fails to spontaneously emit electrons unless the electrons are provided with energy greater than or equal to the electrons at rest in the vacuum. Energy can be provided by numerous means, such as by heat or irradiation with light. When sufficient energy is imparted to the atom, ionization occurs, and the atoms release one or more electrons.

Several type of electron emissions are known. One such type is field emission. Field emission refers to the emission of electrons due to an electric field.

In field emission (or cold emission), electrons under the influence of a strong electric field are liberated out of a substance (usually a metal or semiconductor) into a dielectric (usually a vacuum). The electrons tunnel through a potential barrier. Field emission is therefore a quantum-mechanics phenomenon. A more detailed discussion of the physics of field emission can be found in U.S. Pat. No. 4,663,559 to Christensen.

The shape of a field emitter effects its emission characteristics. Field emission is most easily obtained from sharply pointed needles or tips whose ends have been smoothed into a nearly hemispherical shape by heating. Tip radii as small as 100 nanometers have been reported. As an electric field is applied, the electric lines of force diverge radially from the tip and the emitted electron trajectories initially follow these lines of force. Fabrication of such fine tips, however, normally requires extensive fabrication facilities to finely tailor the emitter into a conical shape. Further, it is difficult to build large area field emitters since the cone size is limited to the lithographic equipment. It is also difficult to perform fine feature lithography on large area substrates as required by flat panel display type applications. Thus, there is a need for a method of making field emitters which do not suffer from these problems.

The electron affinity (equal to work function) of the electron emitting surface or tip of a field emitter also effects emission characteristics. Electron affinity thus corresponds to the voltage (or energy) required to extract or emit electrons from a surface. The lower the electron affinity, the lower the voltage required to produce a particular amount of emission. If the electron affinity is negative, then the surface shall spontaneously emit electrons until stopped by space charge, although the space charge can be overcome by applying a small voltage, e.g., 5 volts. Compared to the 10,000 to 20,000 volts normally required to achieve filed emission from tungsten, a widely used field emitter, such small voltages are highly advantageous. There are several materials which exhibit negative electron affinity, but almost all of these materials are alkali metal based. Alkali metals are quite sensitive to atmospheric conditions and tend to decompose when exposed to air or moisture. Additionally, alkali metals have low melting points, typically below 1 00° C., which may be unsuitable in certain applications.

Thus, there became a need for other materials or coatings to be used in field emitters.

One such material that has been suggested is carbon nanotubes.

Two kinds of carbon nanotubes are currently available: multi-walled nanotubes (MWNTS) and single-walled nanotubes (SWNTS). MWNTS are comprised of 2 to 30 concentric graphitic layers, have outer diameters from 10 to 50 nm and their length is greater than 10 $\mu$m. SWNTS are much thinner: 1.0 to 1.4 nm in diameter, while their length is 100 um.

Carbon nanotubes have attracted considerable attention as a promising material for electron emitters cathodes for cathode nanotubes and other similar devices.

For example, field emission from an isolated multi-walled nanotube was first reported by Rinzler, AG, et al. in *Science*, 1995, 269, 1550–3. Subsequently, many experimental results were published on field emission for multi-walled nanotubes, such as by Collins, et al., in *App. Phys. Letter,* 1996, 96, 1969–70; Saito, et al., in *Nature,* 1997, 389, 554–5; Bonard, et al., in *Ultramicroscopy,* 1998, 73, 7–15 and for single walled nanotubes, such as by Saito, et al, in *Jpn. J. Appl. Phys,* 1997, 36, L1340–2, and Bonard, et al., in *App. Phys. Lett.,* 1998, 73, 918–20. Very recently, nanotubes have been applied as cold electron sources in display devices as described by Saito, et al. in *Jpn. J. Appl. Phys.,* 1998, 37, L346–8 and they have successfully manufactured nanotube based cathode ray tube (CRT) lighting elements.

Field emission has also been observed in these two kinds of nanotube carbon structures. L. A. Chemozatonskii, et al., in *Chem. Phys. Letters,* 233 63 (1995) and *Mat. Res. Soc. Symp. Proc.,* Vol. 359, 99 (1995) have produced films of nanotube carbon structures on various substrates by the electron evaporation of graphite in $10^{-5}$–$10^6$ Torr. These films consist of aligned tube-like carbon molecules standing next to one another. Two types of tube-like molecules are formed; the Atubelites whose structure includes single-layer graphite-like tubules forming filaments-bundles 10–30 nm in diameter and the B-tubelites, including mostly multi-player graphite-like tubes 10–30 nm in diameter with conoid or dome-like caps. The authors report considerable field electron emission from the surface of these structures and attribute it to the high concentration of the field at the nanodimensional tips. B. H. Fishbine, et al., *Mat. Res. Soc. Symp. Proc.,* Vol. 359, 93 (1995) discuss experiments and theory directed towards the development of a buckytube (i.e., a carbon nanotube) cold field emitter array cathode.

The carbon nanotubes possess the following properties favorable for field emitters: (1) favorable electronic structure, (2) good in plane electrical conductivity, (3) a sharp tip, (4) high chemical stability and (5) high mechanical strengths.

Although the present inventors have found that cathodes made of nanotubes, such as multi-walled carbon nanotubes, have shown good electron field emission characteristics, the present inventors have noted traces of evaporation of cathode material, i.e., carbon from the nanotubes, on the walls of the device during electron field emission, especially in the case of local overheating of the emitting surface in high vacuum that usually exists within devices based on this effect, such as CRTs, flat panel displays and the like. Thus, the present inventors searched for a means to prevent the evaporation of carbon cathode material as well as improve the electron emission characteristics of the cathodes made of carbon nanotubes.

The present inventors felt that this could be achieved by coating the nanotubes. One of the roles of the coating is to lower the effective work function for the electrons escaping from the cathode and to increase, as a consequence thereof, the intensity of the emission. In order to fulfill that role, the coating material should have either a negative or very small positive electron affinity. Since the effective work function is proportional to the dielectric constant of the coating and to the difference between the conduction band minimum and the Fermi level, these two parameters should be minimized by modifying morphological or physio-chemical properties of the coating. The coating should also provide the passive protection for the surface of the sharp emitter by shielding it against ion bombardment and protecting it from over heating. Hardness and good thermal conductivity are, thus, desirable properties for the coating material. Moreover, the coating material should also substantially reduce or prevent the evaporation of carbon from the nanotubes during the operation of the electron field emitter comprised of nanotubes.

Diamond has emerged a promising material due to its chemical inertness and stability and favorable combination of thermal and electronic properties.

However, for a full understanding about diamonds, again a slight digression is necessary.

It has been experimentally shown that the (111) surface of diamond crystal has an electron affinity of −0.7 to −0.5 electron volts, showing it to possess negative electron affinity. It has been alleged that diamond has favorable electron emission properties comprising low voltage operation, high current density, robust operation, low emission noise and high chemical inertness against emission surface contamination. Geis, et al., *IEEE Electron Device Lett.,* 12, 465 (1991), Geis, et al., *App. Phys. Lett.,* 67, 1328 (1995).

A common conception about diamonds is that they are very expensive to fabricate. This is not always the case, however. The use of plasma chemical vapor deposition processes appears to provide promising ways to bring down the cost of producing high quality diamond thin films. It should be noted that diamond thin films cost significantly less than the high quality diamonds used in jewelry. Moreover, high fidelity audio speakers with diamond thin films as vibrating cones are already commercially available.

Diamond cold cathodes have been reportedly used. The diamond cold cathodes are formed by fabricating mesaetched diodes using carbon ion implantation into p-type diamond substrates. It has been alleged that the diamond can be doped either n- or p-type. In fact several methods show promise for fabricating n-type diamond, such as bombarding electron emission film with sodium, nitrogen or lithium during growth. However, in current practice, it is extremely difficult to fabricate n-type diamond, and efforts for n-type doping usually result in p-type diamond. Furthermore, p-type doping fails to take full advantage of the negative electron effect, and pure or undoped diamond is insulating and normally prevents emission.

It was initially assumed that the emission properties of the diamond originate exclusively in its negative electron affinity (NEA) permitting electrons to leave the diamond surface without (or with small) thermal activation (the vacuum electron energy level is lower than the conduction band of the diamond, and the energy barrier between them does not exist, or can be neglected as a result of the tunnel effect). Different deposition techniques have been used to form the coatings, and the obtained results have indicated that besides its negative electron affinity, some other factors such as textural features, microcompositional map and surface resistivity, can significantly influence the emission properties of the cathode. See, for example, Zhimov, et al., *J. Vac. Sci. Technol.,* A15, 1733 (1997); Zhou, et al., *J. Electrochem. Soc.,* 144, L224 (1997); Pryor, *App. Phys. Lett.,* 68, 1802 (1996); Li, et al., *J. Phy. D.: App. Phys.,* 30, 2271 (1997); Klages, *Ann. Phys.,* A 56, 513 (1993); Zhu, et al., *J. Vac. Sci. Technol.,* B14, 2011(1996); Meyers, et al., *J. Vac. Sci. Technol.,* B14, 2024 (1996); and Givargizov, et al., *J. Vac. Sci. Technol.,* B14, 2030 (1996). The results obtained through such a diversified research work have shed more light on the role of the WBGM (Wide Band Gap Materials) coatings and helped to establish a set of general criteria useful for the future direction of research and development in this field as well as for the optimization of the fabrication of efficient electron sources.

However, today's diamond coated cathodes do not perform as it might be expected and have low emission efficiency. This is explained in terms of the influence of the texture of the deposited diamond: the coatings usually consist of micrometer-size crystallites having (100), (110), and (111) planes as the exposed surfaces. The electrons are not emitted from those flat surfaces but rather from microtips or edges of the faceted crystallites, see, Zhu, et al. *J. Appl. Phys.*, 78, 2707 (1995). As a consequence, only 1 to 10% of the diamond surface contributes to the electron emission and emission sites are not uniformly distributed.

Recently obtained results indicate that the problem of the efficiency of the diamond coating cold cathodes might be more complicated, and that the simple microtextural features can not account for the observed behavior. Various factors must be taken into account, such as establishing the effective work functions for electron emission and the influence of defects, impurities and morphology of the diamond coatings. There are indications that the processes occurring at the interface between metal (or semiconductor) and the diamond influence the emission more than the processes of electron "evaporation" from the diamond surface. See, Zhimov, et al., *J. Vac. Sci. Technol.*, A15, 1733 (1997), Zhimov, *Jour De Phys. IV, Colloque C5*, 6, 107 (1996), and Givargizov, et al., *J. Vac. Sci. Technol.*, B14, 2030 (1996). It is believed that the presence of different kinds of defects is accompanied by the widening of the typical diamond peak in Raman spectra (1332 $cm^{-1}$) from FWHM<5 $cm^{-1}$ up to FWHM~11 $cm^{-1}$, which is very close to the value for diamondlike-carbon (DLC) structures. Cathodes coated with ball-like and cauliflower-like diamond, having much smaller surface resistance than continuous high quality diamond, show, e.g., better emission properties. See, Li, et al., *J. Phys. D.: App. Phys.*, 30, 2271(1997). Again, the improvement of the cathode characteristics is accompanied by deterioration of the diamond peak in the Raman spectrum and with simultaneous appearance of wide peaks typical for graphite phase (1568 $cm^{-1}$) and for amorphous carbon (1482 $cm^{-1}$). The fact that the thickness of the coating also influences the electron emission efficiency (see, Zhimou, et al, *J. Vac. Sci. Technol. A*15, 1733 (1999)) suggests that the electron transport through the coating should also be taken into account.

Moreover, no one heretofore had used diamonds or diamond like carbons to coat nanotubes. The typical methods used in the art for coating a substrate with diamonds utilized chemical vapor deposition, sputtering and ion beam deposition using as raw materials methane and hydrogen, and these produced diamond films of having a thickness in the range of about 500 to 5000 angstroms, which dimensions are too large to coat the nanotubes used in field electron emitters.

Heretofore, it was unknown whether coating the nanotubes with diamonds whose dimensions are decreased by ten fold would be successful in enhancing the electron field emission characteristics of the nanotubes. Moreover, it was unknown heretofore whether diamond coatings would be capable of preventing the evaporation of cathode material, e.g., carbon nanotubes during electron field emission.

A general picture of the mechanisms involved in electron emission encompasses the tunneling of electrons from metal into conduction band of the coating. Under influence of the field, electrons are transported through the conduction band to the surface where they escape into vacuum by tunneling. The emission current is calculated by the one-dimensional Fowler-Nordheim equation. See, e.g., Fowler, et al. *Proc. Roy. Soc. London*, A19, 173 (1928). This equation was adapted and applied to various emitting surfaces. In the majority of the studied cases, the Fowler-Nordheim diagrams are linear, suggesting that the tunneling step is the one controlling for the whole process of electron emission. This general picture often accounts for the field electron emission, but the mechanisms of each of the steps involved in the process are still elusive, and several models have been employed in an attempt to account for the experimental data. See, e.g., Zhirnov, et al, *M. R. S. Bulletin,* 23 42 (1998).

From the foregoing, it is apparent there is a clear need for a thermodynamically stable material with electron affinity for use as coating over a cathode comprised of nanotubes. The present inventors have found that coating the nanotube particles of the field emitters with either diamond or diamond like carbon has solved the problems described hereinabove. More specifically, they found that diamond and diamond like carbon coating on nanotubes have not only enhanced the electron emission characteristics thereof, but also have retarded and/or prevented the evaporation of carbon from carbon nanotubes during the operation of an electron field emitter having a cathode comprised of nanotubes.

SUMMARY OF THE INVENTION

Accordingly, the present invention is directed to a method for enhancing electron field emission from an electron field emitter in which a cathode is comprised of carbon nanotubes which comprises coating the nanotubes with an enhancing electron field emission effective amount of diamond or diamond like carbon. In another embodiment, the present invention is directed to a method of retarding the evaporation of carbon from a cathode comprised of carbon nanotubes during electron field emission, which method comprises coating said nanotubes with a carbon evaporating inhibiting effective amount of diamond or diamond-like carbon. The present invention is also directed to a carbon nanotube coated with diamond or diamond like carbon. Furthermore, the present invention is directed to a cathode in an electron field emitter comprising a nanotube coated with a carbon evaporating inhibiting effective amount of diamond or diamond-like carbon. Finally, in another embodiment, the present invention is directed to the field emitter comprising a cathode comprised of carbon nanotubes coated with a carbon evaporating inhibiting effective amount of diamond or diamond-like carbon.

DETAILED DESCRIPTION OF THE INVENTION

Figure 1:
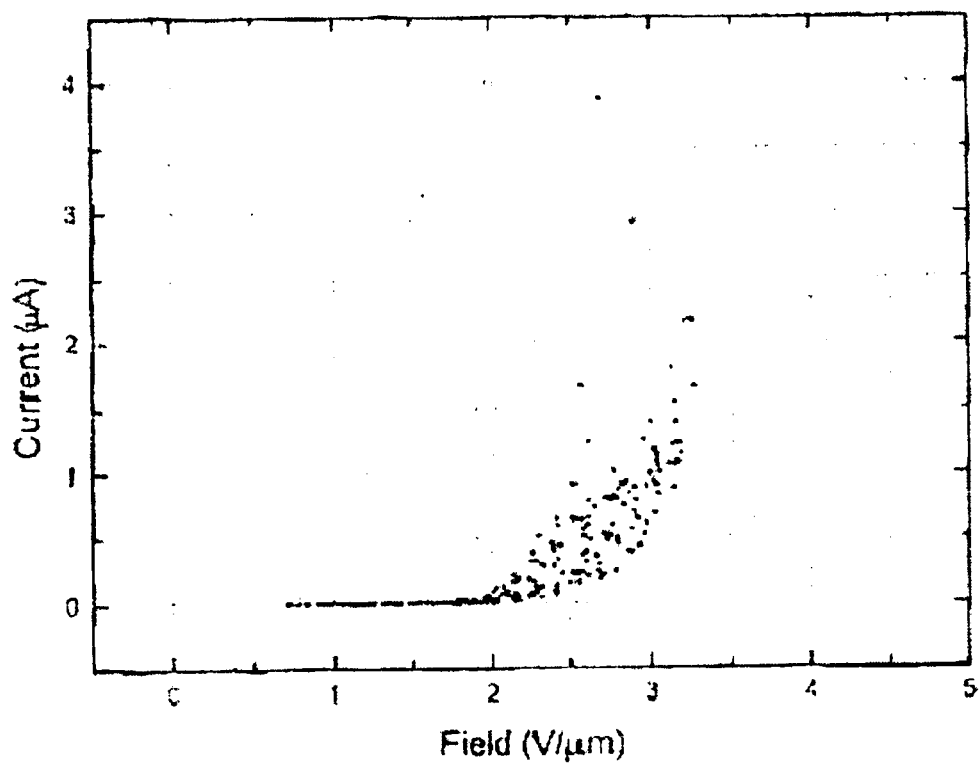
FIG. 1 depicts the electron field emission from a diamond coated carbon nanotube cathode, prepared as in Example 1.

As indicated hereinabove, an aspect of the present invention is directed to a nanotube coated with diamond or diamond like carbon. It is also directed to an electron field emitter cathode comprising a substrate, a nanotube coating the substrate and a substantially uniform coating of the nanotube, wherein the coating comprises diamond or diamond like carbon. Another aspect of the present invention is directed to retarding or preventing the evaporation of carbon in an electron field device whose cathode is comprised of a substrate and a nanotube coating the substrate, the method comprising substantially uniformly coating the nanotube with a coating material, said coating material comprised of diamond or diamond like carbon.

The term "substrate" as used herein in connection with embodiments disclosed herein refers to the structure that provides the mechanical support for the electron emitter. The substrate can be a single crystal, polycrystalline, glassy or amorphous material whose surface is the surface on which the nanotubes are deposited or grown. It may comprise a metal film. The metal film may comprise at least one transition metal or compound or alloy thereof. The transition metal may be selected from the group consisting of Fe, Co, Ni, Cr, Mn, Mo, W, Re, Ru, Os, Rh, Ir, Pd, Pt, Zn and Cu, preferably from a subgroup consisting of Fe, Co, Ni and mixtures or alloys of the same. Alternatively, the substrate may consist of a mechanical support structure that has deposited on it a monolayer film, a multilayer film, or a structure having a pattern or architecture. The deposited structure of a fraction thereof would form the growth surface. In this embodiment, the substrate may comprise at least one material selected from the group consisting of ceramics, metals, glasses, semiconductors, alloys, conductive metals, dielectrics or mixtures thereof. The substrate can be flat, curved or any shape suitable for a field emission device. For example, the substrate may be in the form of a rod with the emitters attached on the outer surface.

The substrate can comprise one or more layers that may be structured to form an electronic architecture. In particular, an architecture may be constructed which allows each emitting structure of an array of emitting structures to be separately addressable electrically. The substrate can also contain a pattern which is either uniform or non-uniform. The pattern may include contacts formed and leading to the emitting structures. That is, the substrate may include a plurality of current paths on the substrate, each coupled electrically to a respective one or more of the electron emitter structures.

The substrate is not comprised of materials that are reactive with the nanotubes or if the nanotubes are formed in situ, with any material reactive with the reactants used in the process for their preparation or with intermediates formed during the process. Moreover, the substrate is free of materials that would interfere with the formation of the diamond or diamond-like carbon coating.

If the support substrate also serves as a cathode interconnecting layer, the support substrate is basically made of a conductive material such as Mo, Ta, W, Cr, Ni, Cu, carbon, or a semiconductor such as impurity-doped Si. When a cathode interconnecting layer is separately formed, the support substrate is basically made of an insulating material such as glass, quartz, or a synthetic resin, or from a semiconductor material such as Si.

As used herein, the term nanotube means a hollow article having a narrow dimension (diameter) of about 1–200 nm and a long dimensional length, wherein the ratio of the long dimension to the narrow dimension, i.e., the aspect ratio, is at least 5. In general, the aspect ratio is between 10 and 2000. Carbon based nanotubes are hollow structures composed at least partially of carbon atoms. The carbon nanotube consists of single sheets of graphite with a tubular structure. They can be doped with other elements, e.g., metals, B, N and the like. Typically, the carbon-based nanotubes are composed between 95% to 100% of carbon. The carbon based nanotubes can be either multi-walled nanotubes (MWNTs) or single walled nanotubes (SWNTs) or double walled nanotubes (DWNT), as described hereinbelow. A MWNT, for example, includes several nanotubes, each having a different diameter. Thus, the smallest diameter tube is encapsulated by a larger diameter tube which in turn is encapsulated by another larger diameter nanotube. A SWNT, on the other hand, includes only one nanotube. A DWNT, includes two nanotubes in which the smallest diameter tube is encapsulated by a larger one. MWNTs, typically, are produced either as single MWNTs or as bundles of MWNTs. SWNTs, on the other hand, are produced typically, as ropes of SWNTs, where each strand of the rope is a SWNT. Single-walled nanotubes are 1–2 nm in diameter, while multi-walled nanotubes are typically 2–30 nm in diameter. As used herein, the term "nanotubes" also includes multi-walled nanotubes wherein the nanotubes are all aligned in one direction, i.e., they stand normal to the substrate surface.

The carbon nanotubes used in the present invention are commercially available or are prepared by art recognized techniques. For example, the nanotubes may be prepared using an arc discharge as described in U.S. Pat. No. 6,057,637 to Zettl, or U.S. Pat. No. 6,097,138 to Nakamoto, et al. and in articles by S. Iijima, *Nature*, 354, 56, 1991, or Colbert, et al., *Science*, 266, 1218 (1994), the contents of all of which are incorporated by reference. For example, the nanotube may be produced by an arc discharge method using a carbon rod or a granular carbon as an electrode, or a laser ablation method irradiating an ultraviolet laser on a graphite surface, preferably in a reaction chamber containing an atmosphere of an inert gas such as helium or argon. The carbon is vaporized and forms a soot. The nanotube is included in the soot, most of which is deposited on the cathode. By pulverizing the deposit on the cathode, and then refining the pulverized substances using an organic solvent, such as ethanol, and the like, carbon nanotubes are obtained.

Alternatively, nanotubes may be prepared by catalytic pyrolysis of hydrocarbons as described by Endo, et al., in *J. Phys. Chem. Solids*, 54, 1841 (1993), or by Terroner, et al., in *Nature*, 388, 52 (1997) or by Kyotani, et al., in *Chem. Mater.*, 8, 2190 (1996), the contents of all of which are incorporated by reference.

Other methods for preparing nanotubes, especially single walled nanotubes, are described in U.S. Pat. No. 5,424,054 to Bethune, et al. (in which a carbon source, e.g., graphite, is vaporized in an inert atmosphere and contacting the carbon vapor with cobalt); in articles by Iijima, et al., in *Nature*, 363, 603–605, (1993), Bethune, et al., in *Nature*, 363, 605–607 (1997), Journet, et al. in *App. Phy.*, A67 (1998), (which disclose an arc discharge process of simultaneous vaporization of graphite and metal catalyst); by Journet et al., in *Nature*, 388, 756–758 (1997), (in which carbon was vaporized using a mixture of 4.2 at. % Ni and 1 at. % Y as a catalyst which provided a yield of about 10–20% on average, with a small portion of the soot (the collaret) containing essentially larger amount of SWNTs, reaching 70%); Liu et al., in *Carbon*, 37, 1865–68(1999), (in which a sulfur promoted Fe/Co/Ni catalyst was used and a hydrogen containing gas media in a wide shallow groove filled with a mixture of graphite and metal powders were used for an anode and for the cathode, a pencil-like sharpened cathode rod which was tilted with respect to the working surface of the anode); P. Nikolaev, et al., in *Chem. Phys. Lett.*, 243, 49 (1995), (which used a pulsed laser vaporization (PLV) of transition-metal/graphite composite pellets); by A. Thess et al., in *Science*, 273, 483 (1996) and M. Yudasaka et al., in *Chem. Phys. Lett.*, 278, 102 (1997) (in which double laser pulses were used or in which the target was divided into graphite and metal halves along the cylindrical axis, respectively; by Rinzler, et al., *Appl. Phys.*, A67 (29) (1998) (which described pulsed laser vaporization of pellets containing carbon and metal with the metal being present in the pellets at 6–10 wt %, and the pellets were vaporized by laser beam, maintained at 1200° C., and Ar at 500 Torr is used as the carrier gas); by K. Hemadi, et al., in *Carbon*, 34, 1249–1257 (1996) (which described the catalytic chemical vapor deposition (CVD) of carbon-containing gases for SWNTs synthesis with disproportionation of carbon monoxide at 1200° C. with molybdenum or Ni/Co particles supported on alumina are used as catalysts). The contents of all of these aforementioned publications are incorporated herein by reference.

As indicated hereinabove, the nanotubes include those MWNTs in which the nanotubes are aligned in the same direction, i.e., large arrays of perfectly aligned carbon nanotubes, standing normal to the substrate surface. They are prepared by art recognized techniques such as those described by Ren, et al., in *Science*, 1998, 282, 1105 and Andrews, et al., *Chem. Phys. Lett.*, 1999, 303, 467, the contents of both of which are incorporated by reference. They describe two different techniques. The technique described in the former article employs the plasma enhanced hot filament chemical vapor deposition from acetylene/ammonia gas mixture onto nickel-coated substrates, and produces carbon nanotubes with controllable diameters from 20 to 400 nm and length from 0.1 to 50 $\mu$m on the surfaces as large as several sq.cm. It is important, that substrate temperature as low as 650 C is used, which permits to employ the industrial glass for deposition of the tubes. Alternatively, a supported palladium metal as a catalyst for nanotube growth could be utilized as described in an article by Tsai, *App. Phys. Lett.*, 1999, 74, 1462, the contents of which are incorporated by reference.

The other technique described in *Chem. Phys. Lett.*, 1999, 303, 467, does not require the use of surfaces with a preformed metal catalyst layer, and thus is more versatile. It employs the thermal decomposition of a volatized ferrocene-xylene mixture at about 675° C. in a quartz tube reactor, and produces fairly well structured MWNT arranged in large arrays (up to a dozen of sq. inches) over the clean quartz surfaces.

Double walled carbon nanotubes (DWNTs) are also contemplated to be encompassed within the definition of nanotubes. They are described in U.S. Ser. No. 09/680,291, entitled "Double-Walled Carbon Nanotubes are Methods for Production and Application", which application is owned by the same assignee as that of the present application, and the contents of which are incorporated by reference.

They are prepared by a method which comprises providing a source of carbon and a catalyst comprised essentially of the transition metal of the iron group of the periodic table of elements and sulfur in a reaction zone having a DWNT forming atmosphere comprised essentially of hydrogen containing gas and subjecting the carbon and catalyst to heat in the reaction zone in an arc discharge.

More specifically, to produce DWNTs by an arc discharge technique, the evaporation of a metal-graphite electrode was employed. The anode was a graphite rod (usually about 8 mm in diameter) with drilled channel (3.2 mm in diameter and 200 mm in length) filled with catalyst. The cathode was a graphite rod 10 mm in diameter and 15 mm in length. The catalyst was prepared in the following way: a mixture of Fe, Co and Ni powder metals and elemental S was ground in a mortar and heated at 750° C. for 1 hour. The conglomerate was then ground in ball mill to a micron particle size and then intimately mixed with carbon powder. A 3.2 mm channel drilled in the graphite anode was tightly filled by this mixture.

Figure 8:
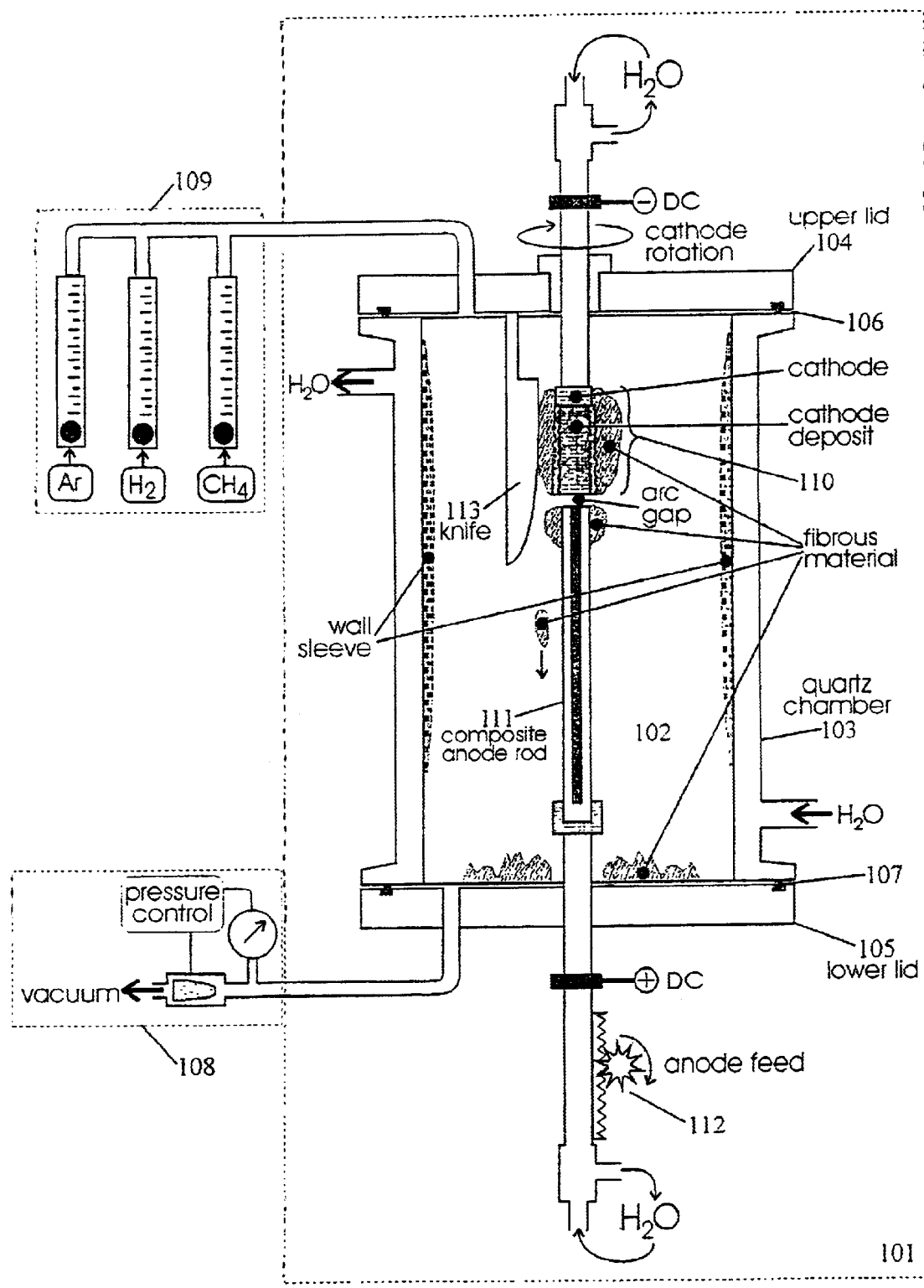
FIG. 8 is a schematic representation of an apparatus wherein electron arc discharge vaporization of a composite rod is utilized to form a DWNT-rich product.

The arc synthesis was carried in a reaction chamber (FIG. 8) containing an atmosphere of Ar and $H_2$ mixture. The voltage drop across the arcs gap was 23–26V and the gap width was kept constant and equal to 1.5–2 mm. The duration of the arc evaporation process was about 2 hours. Two types of carbon material were obtained: (1) cloth-like deposits on the reaction walls and (2) the remaining product, an elastic deposited on electrodes and the cathode, deposit as an elastic fibrous material which contained the DWNTs in greatest concentration. However, it was found that in this process, the abound with DWNTs fibrous material was also forming in close proximity to the arc, where the temperature is optimal, soon after the process starts and tends to densely surround the arc space and thus to cancel in this area the normal gas circulation necessary for maintaining the stable arc and tube production. Furthermore, the fibrous materials undergo prolonged and excessive heating and illumination, which lead to sintering of nanotubes and their destruction. To avoid these undesirable phenomena, the fibrous material is removed from the reaction zone, such as by a mechanical mode, e.g., a tungsten scraper, which continuously detaches the fibrous material just formed at the surface of cathode deposit, due to rotation of the cathode during the synthesis. (FIG. 8, the "knife", 113).

The heat causes the carbon to vaporize, producing a carbon containing vapor, the DWNT atmosphere, that is quenched causing the vapor to condense, resulting in the formation of the DWNT product outside of the heated reaction zone, where it is recovered. It is preferred that the DWNT atmosphere contains an inert gas in addition to the hydrogen, advantageously argon. The DWNT forming atmosphere is preferably maintained at a pressure in the range of 10 Torr to 3 atmosphere. The catalyst is preferably comprised essentially of a mixture of iron, cobalt and nickel powder, which is advantageously preheated to cause the sulfur to react with the metal particles of the mixture. It is preferred that the reaction zone is heated in an electric arc discharge system in a reaction chamber, wherein the DWNT atmosphere is maintained. The arc discharge system advantageously utilized carbon electrodes, one or both of which are consumed to provide some or all of the carbon to be vaporized. Depending upon whether a direct current or an alternate current arc discharge system is employed, one or both of the carbon electrodes is vaporized to provide carbon as a source of the DWNT product.

Advantageously, the catalyst mixture is placed in a central hole in the consumable electrode (DC system) located at the arc end of the electrode. Carbon particles are advantageously mixed with the catalyst particles to provide further source carbon for vaporization in the reaction zone.

The hydrogen of the DWNT atmosphere is preferably comprised of the hydrogen in a hydrocarbon gas such as methane, ethane and acetylene.

The DWNTs thus formed are in bundles with discrete tubules clearly visible on the periphery. The observed length of these tubes in bundles is more than 1 μm. The HRTEM micrographs revealed that most of the tubules consist of two concentric nearly cylindrical grapheme layers, double wall nanotubes (DWNTs). In general, the outer diameter of DWNTs ranges in between 3.4 nm to 5.5 nm while that of the inner tube varied between 2.7 to 4.7 nm.

In the present invention, it is preferred that the nanotubes are multi-walled and that the nanotubes are straight with a diameter between 7 and 12 nm. The walls are made of 5–50 layers of concentric graphemes layers. The preferred MWNT length range from 0.5 to 10 μm, and they have capped ends.

In a preferred embodiment, the nanotubes are prepared by arc discharge. More specifically, an anode comprised of graphite (carbon source) and a cathode electrode (collecting member) are placed in a vacuum processing chamber. The vacuum processing chamber is then evacuated, and an inert gas such as He or Ar, is introduced into the vacuum processing chamber to set an inert gas atmosphere. The inert gas is present at an effective pressure to form the nanotube and to quench the vaporized carbon. Preferably the pressure of the inert gas ranges from about 20 Torr to about 1 atm Torr, and preferably about near atmosphere pressure in the vacuum processing chamber. Subsequently, an effective voltage, e.g., a DC voltage of 10V to 20V is applied between the anode and cathode electrodes to generate arc discharge so that the current is about 100 A. The vaporized carbon is quenched by the gas and is deposited on the walls of the reactor and as the cathode. Subsequently, the nanotube is removed from the cathode and the walls of the chamber and then isolated by technique known in the art by one of ordinary skill. For example, the cathode electrode is dipped into ethanol, and ultrasonic waves are applied to separate the carbon nanotubes from the cathode electrode and disperse the carbon nanotubes in ethanol. The carbon nanotubes are then removed from ethanol by a ceramic filter or filter paper and dried. Once separated, the carbon nanotubes can optionally be purified by techniques known to one of ordinary skill in the art.

Alternatively, an AC voltage, instead of a DC voltage, can also be applied between the pair of graphite electrodes.

Subsequently, the carbon nanotubes are applied to the support substrate by methods known by one of ordinary skill in the art, e.g., by coating, contact bonding, or burying, thereby forming a carbon nanotube layer.

Alternatively, if not combined with a binder as described hereinbelow, the nanotubes may be prepared and applied to the substrate in situ, without isolation of the nanotubes. For example, a graphite anode is placed in a vacuum processing chamber. The support substrate is directly arranged in the vacuum processing chamber. The vacuum processing chamber is then evacuated, and an inert gas such as He or Ar is introduced into the vacuum processing chamber to set an inert gas atmosphere of 20 Torr to about 1 atm, and preferably near atmospheric pressure in the vacuum processing chamber.

Subsequently, the graphite rod is energized and heated by resistance self-heating. In this way, carbon in the graphite rod is sublimated and deposited on the support substrate to form the carbon nanotube layer.

If the nanotubes are commercially produced or are prepared and then isolated, the nanotubes may be combined with a binder known to one of ordinary skill in the art, e.g., epoxy such as conducting epoxies, (silver epoxy), or non-conducting epoxies (such as Torr Seal®); Teflon; cyanoacrylate; Crazy Glue®; polyethylene; ceramic; soft metals; polyvinylidene-fluoride, or other material that can hold the nanotubes. The nanotubes are suspended in the binder to form a binder nanotube matrix. As used herein, the binder means a binding compound of suitable mechanical properties to retain suitably configured carbon nanotubes in the compound material's structure. Optionally, solvent, preferably a volatile solvent or an aprotic solvent, such as, N,N-dimethylformamide, may be added to the mixture. After application to the substrate, the substrate is dried.

The nanotubes are next coated with diamond or diamond-like substances. If coated with diamond, conventional diamond coating techniques are not satisfactory since the diamond particles formed thereby would be too large for the small nanotubes. The present inventors found that diamond grown from fullerenes were of the proper dimensions, and the nanotubes were coated with diamond using techniques described in the art, such as plasma assisted chemical vapor deposition (PACVD) using various deposition techniques known in the art such as microwave plasma assisted CVD, radio frequency plasma assisted CVD, inductively coupled plasma assisted CVD, and the like. Examples of converting fullerenes to diamond are described in U.S. Pat. Nos. 5,620,512 and 5,462,776, both to Gruen, et al., the contents of both of which are incorporated by reference.

The formation of the diamond film involves forming a fullerene vapor, providing a noble gas stream free of hydrogen and combining the gas with the fullerene vapor, passing the combined fullerene vapor and noble gas carrier stream into a chamber, forming a plasma in the chamber and enabling fragmenting of the fullerene in the plasma to form the diamond film and then depositing the fragmented material onto the nanotube using the aforementioned techniques, e.g., using a microwave plasma deposition.

More specifically, fullerene containing soot is either purified using techniques known in the art such as by treatment by contact with methanol to remove hydrocarbons, or used "as is" without purification. The treated or non-treated fullerene is thoroughly degassed by conventional and/or thermal treatment, and then placed in a sublimation chamber which is coupled to a plasma deposition chamber and the volume of the sublimation is coupled to a volume of the plasma deposition chamber. Fullerene containing vapor is introduced into the plasma deposition chamber by heating the sublimation chamber to a temperature sufficient to cause fullerene sublimation. Preferably, the temperature ranges from about 350° C. to about 800° C. A noble gas carrier gas (e.g., argon) is introduced into the sublimator to transport the sublimed fullerene containing vapor into the deposition chamber. Under saturation conditions, the atomic carbon content in the argon gas introduced into the chamber is about 0.14% mol % (based on the vapor pressure of pure $C_{60}$). The nanotubes covered substrate is at the bottom of the deposition chamber and is situated therein for accumulation of deposited carbon. An excited plasma is prepared in the chamber containing the noble gas and the fullerene, such as by using a microwave generator to generate a microwave in the chamber, which causes fragmentation of the fullerene with subsequent impingement on the nanotube coated substrate.

Although diamond can assume several orientations, the preferred orientation for the diamond is (111). The (111) orientation provide the sharpest vertical features. The (111) orientation also grows the fastest in the vertical direction and the (111) surface of diamond has a negative electron affinity. Nonetheless, other orientations of diamond can be used as long as the diamond film retains negative electron affinity.

Besides diamond, the nanotubes can be coated with diamond like substances.

The term "diamond-like carbon" (DLC) is a term of art, and it is used in the present application as is understood by one of ordinary skill in the art. It means that the carbon processes appropriate short range order, i.e. a suitable combination of $sp^2$ and $sp^3$ bonding may also provide for field emission materials with high current density. By short range order is generally meant an order arrangement of atoms less then about 10 nanometers (nm) in any dimension.

The diamond-like carbons are carbonaceous structures with both $sp^2$ and $sp^3$ hybridized bonds in an amorphous form. DLC consists of an amorphous matrix of carbon atoms or a mixture of carbon and hydrogen atoms very largely linked in a tetrahedral structure like carbon in diamond.

Diamond-like carbon is a term used to describe hard carbon films which are mostly metastable amorphous material but can include a microcrystalline phase. Examples of diamond like carbon include amorphous diamond (a-D), amorphous carbon (a-C), tetrahedral amorphous carbon (ta-C) and diamond-like hydrocarbon and the like. Ta-C is the most preferred diamond like carbon.

DLC films have been prepared by a variety of method, and some of which are described in U.S. Pat. Nos. 5,470,661 and 6,165,676, the contents of both which are incorporated by reference. DLC coating have been prepared by such techniques as r.f. or d.c. plasma assisted chemical vapor deposition (CVD), sputtering, vacuum arc and ion beam deposition from a variety of solid or gaseous source materials. In addition, DLC coating can be formed either by PACVD or by fullerene cathode arc plasma deposition. DLC films are characterized by an extreme hardness which is measured to be in the range 2000–5000 $kg/mm^2$, a generally low friction coefficient and usually very high internal stress. The films deposited using plasma assisted CVD (PACVD) usually incorporate up to 60% hydrogen, while those deposited by sputtering or a high vacuum arc may contain only small amounts of hydrogen, or none at all.

The diamond-like carbon used for coating the nanotube must also have a negative electron affinity.

The coating of the diamond-like carbon or the diamond is very thin. The amount of coating is sufficient for the electron field emitter to prevent the evaporation of carbon from the nanotubes. Preferably, the thickness of the coat on the nanotube ranges from about 10 to about 100 nm and, more preferably, from about 20 to about 50 nm. Moreover, it is preferred that the nanotubes are coated substantially uniformly, although it is more critical for the tips of the nanotubes to be coated with the diamond or diamond-like coating. Moreover, if diamond is used for coating the nanotubes, it is preferred that the grain size of the diamond ranges from about 20–60 nm of diamond.

The diamond or diamond coated nanotube supported on the substrate serves as the electron emitting cathode of a field emission device. The field emission device in which the cathode comprises the nanotubes coated with diamond or diamond like carbon can be prepared by conventional techniques known to one of ordinary skill in the art. The exemplification hereinbelow provides some examples.

The present inventors have found that cathodes comprised of nanotubes coated with diamond or diamond-like carbon have significantly enhanced the electron emission relative to a cathode containing an uncoated nanotube. Conducted electron field emission tests have shown that the presence of diamond or diamond-like carbon coatings on carbon nanotubes improve the electron emission characteristics up to 40% or more. Without wishing to be bound, it is believed that the presence of the diamond or like carbon on the emitting surface significantly decreases the value of the work function, thus resulting in higher emission efficiency.

The present inventors also noted another advantage of the present invention. During operation of electron field emitters having a cathode comprised of nanotubes, they noted traces of carbon from the cathode on the walls of the device, especially in cases of local overheating of the emitting surface of high vacuum that usually exists within devices based on this effect, e.g. CRTs, flat panel. However, when the field emitter device was coated with diamond or diamond-like carbon, in accordance with the present invention, no such traces of evaporation of cathode materials were noticed on the walls. Thus, the inventors found that the presence of diamond or DLC coating prevents or significantly retards the evaporation of carbon from carbon nanotubes during electron field emission, especially in the cases of local overheating of the emitting surface that usually exists within devices based on this effect.

The following non-limiting examples further illustrate the present invention.

EXAMPLE 1

Preparation of Diamond Coat or Coated Carbon Nanotube Cathodes (a) The basis of the cathode was a Mo foil, 0.02–0.04 mm thick, cut in shape of coupons (6.5 mm in diameter). One side of the coupon was roughened and coated by a liquid suspension of ground core carbon nanotubes. In addition to Mo foil, the cathodes were made of Cu foils of the same thickness. It was found that the use of Cu foils instead of Mo ones did not cause any visible or measurable difference. Adding small amounts of conventional, conductive binder to the suspension provided good adhesion and electrical contact. An air-brush was used to make a smooth coating with uniform thickness. After drying at room temperature, coupons were heat treated for 15 min at T=150° C., under vacuum. This procedure was repeated 2 to 5 times until a desired thickness of the coating was obtained. Then half of the produced samples were cold pressed, using pressure of 50 to 90 MPa. The best results were obtained with a suspension containing 70–95% MWNT and 5–30% of binder, polyvinilydenfluoride, and using dimethylformamide as a solvent.

Another way to form substrates was to apply a thin coating of colloidal silver on metal coupons and to spray carbon nanotubes on top of it after short drying in air. After drying at room temperature, samples were heat treated under vacuum. In this case, the nature of the liquid component of the nanotube suspension was irrelevant, since the binder was not used. This group of substrates was not pressed.

Both procedures yielded substrates with good adhesion and with good electrical conductivity.

(b) The Cathodes prepared as described hereinabove were coated by diamond thin film. Deposition of diamond coating was performed by microwave PACVD in a conventional belljar type reactor using as-produced fullerene soot as a diamond precursor. Typical plasma parameters comprised total pressure between 1 and 10 kPa, plasma power between 100 and 800 W and substrate temperature of about 1200 K. Argon was used as a plasma carrier gas. The obtained coatings had the structure of nanocrystalline diamond.

The typical threshold field for emission from our carbon nanotube cathodes without final diamond coating was of the order of 2.5 V/$\mu$m. After application of diamond coating, the threshold voltage had dropped to 1.8–1.9 V/$\mu$m (FIG. 1).

EXAMPLE 2
Electron Field Emission from DLC Coated Carbon Nanotube Cathodes The cathodes were prepared in the same way as in Example 1. The DLC coating was made by using a filtered cathodic arc technique. Deposition was performed in pulsed regime with pulse duration of 5 $\mu$s/pulse and with 1 pulse/second. The substrates were pulse biased by −2 kV with frequency of 125 kHz. The obtained DLC coatings had the structure that can be described as tetrahedrally bonded amorphous carbon (ta-C).

The thickness of the coatings was less than 50 nm.

The conducted measurements of electron field emission have shown the improvements of emission characteristics of DLC coated cathodes. The samples with DLC, ta-C, coating have shown the threshold field of 1.3 V/$\mu$m (FIG. 2).

Figure 2:
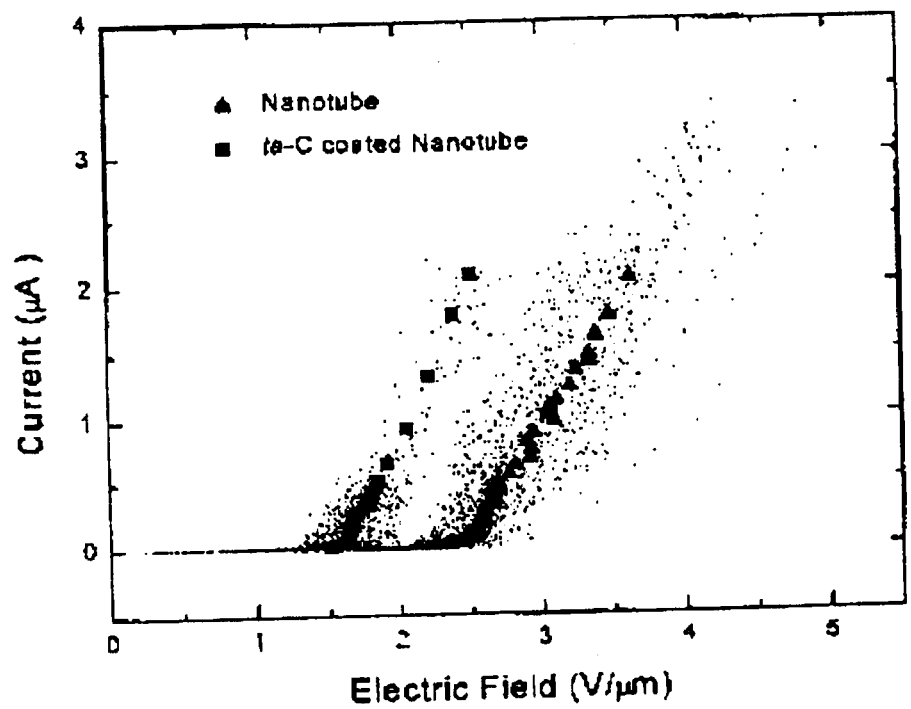
FIG. 2 depicts the improvement of electron field emission of a carbon nanotube cathode after deposition of a diamond-like coating thereon, prepared as in Example 2.

An important feature of I–V diagrams FIGS. 1 and 2 is the steeper slope of the graph, which indicates that not only the threshold field is lowered by the presence of the diamond or DLC coating, but also that with a smaller increase in voltage applied to the cathode, higher emission current is achieved.

EXAMPLE 3
Field Emission Mechanism and Fowler-Nordheim Diagram

Figure 3:
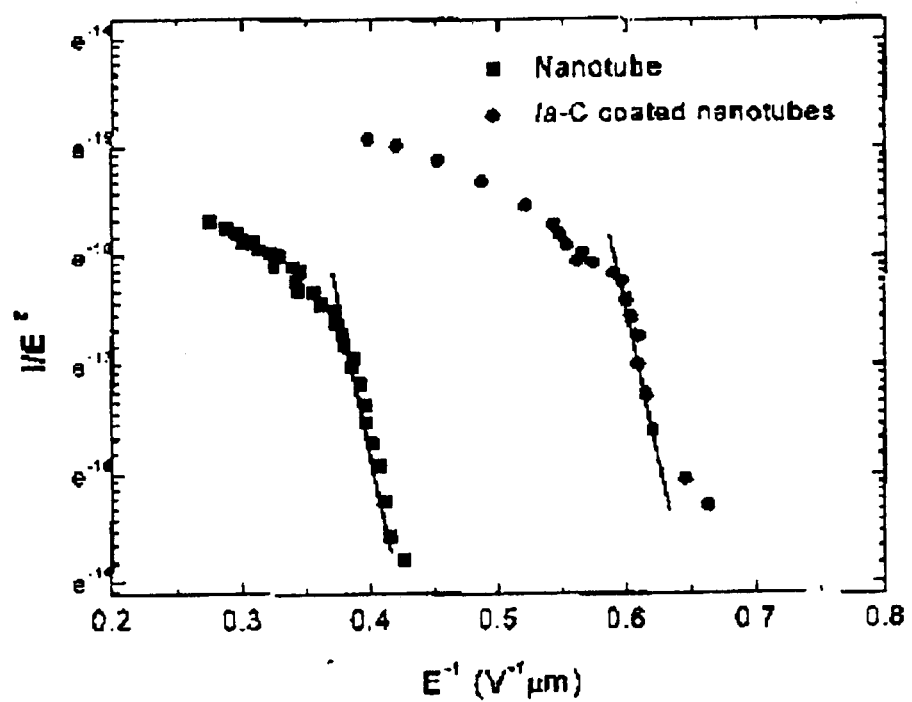
FIG. 3 is a Fowler-Nordheim diagram of the electron field emission from non-coated and from DLC coated carbon nanotube cathode.

The existence of the linear part of Fowler-Nordheim diagram (FIG. 3) indicates that tunneling effects, and not thermal excitation, are controlling factors in electron field emission from the diamond and DLC coated cathodes prepared in Examples 1 and 2. The improvement of electron field emission originates from lowering of the work function for "electron evaporation" through the surface of the cathode material.

EXAMPLE 4
Electron Field Emission Stability of Diamond Coated Carbon Nanotubes Cathode samples for investigating the field emission stability were prepared as described in Examples 1 and 2.

The stability of the emission was investigated by continuous testing during period of time of the order of 1000 hours at the emission current level of the order of 10 $\mu$A. The obtained results have shown that the electron field emission parameters were unchanged and that during this period no noticeable deterioration in emission characteristics was recorded.

Figure 4:
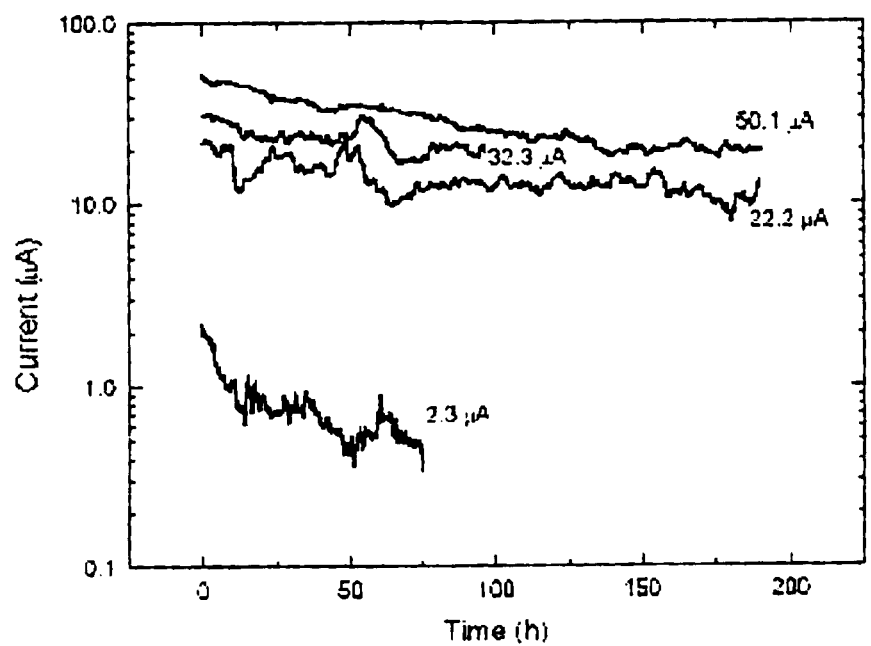
FIG. 4 depicts the electron field emission from diamond coated nanotubes for different emission starting emission currents.

The results of electron field emission stability measurements for different current levels is presented in FIG. 4

Figure 5:
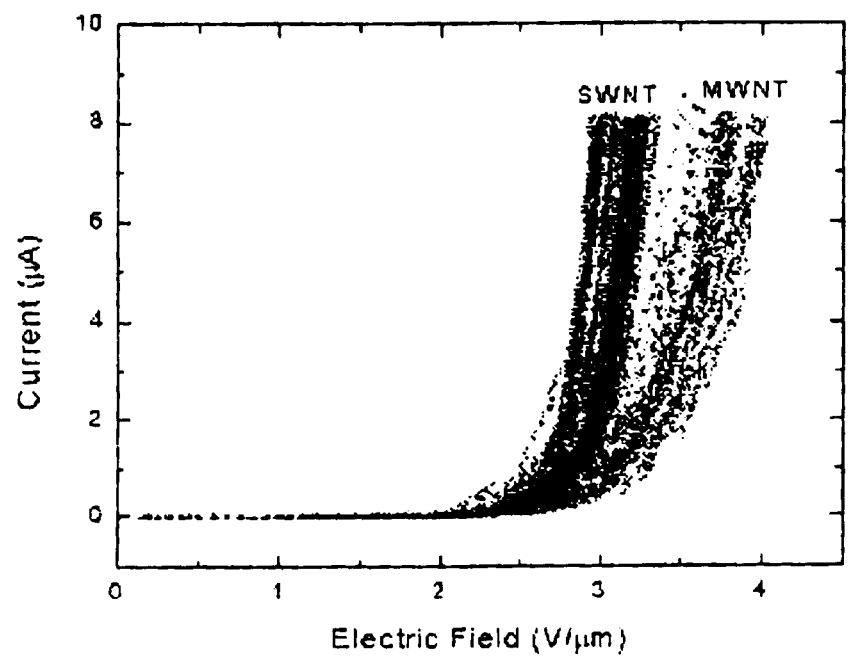
FIG. 5 depicts the emission current ($\mu$A) versus macroscopic electric field (V/$\mu$M) for films prepared from multi-wall (MWNT) and single-wall (SWNT) nanotubes.

COMPARATIVE EXAMPLE 1
Electron Field Emission from Uncoated SWNT and Uncoated MWNT Samples for investigating electron field emission of single-wall (SWNT) and multi-wall (MWNT) carbon nanotubes were prepared as described in Example 1(a). The results of measuring emission current as a function of applied field are presented in FIG. 5. The statistical analysis of the results has shown that the higher emission current is obtained if SWNT were used for fabrication of cathodes.

Figure 6:
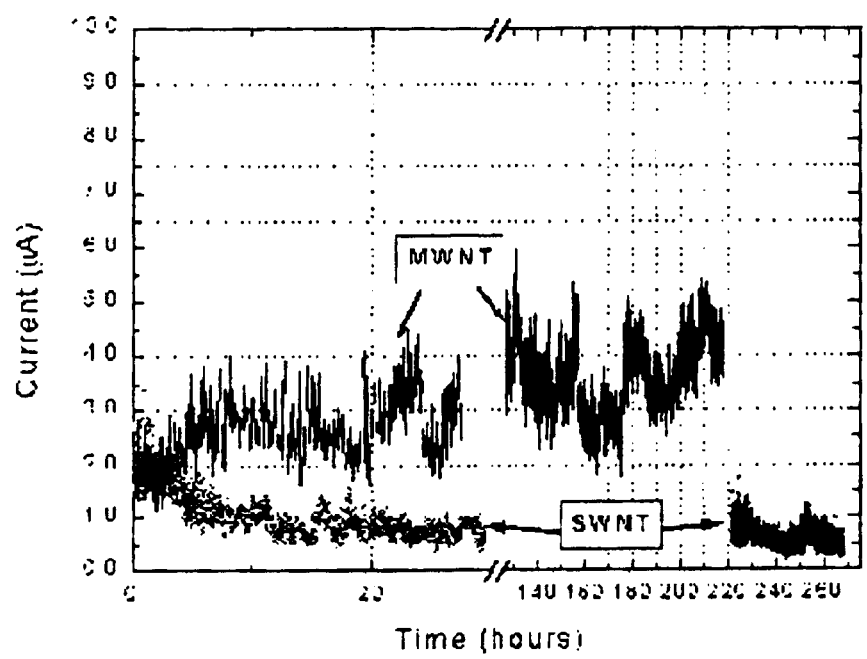
FIG. 6 depicts the emission current ($\mu$A) as a function of time for single-wall carbon nanotube and multi-wall carbon nanotube films.

The emission stability is presented in FIG. 6. The long-term stability of the films was investigated, and the decay in emission from the SWNT film was attributed to the continuous burning-off of the easy-emitting sites.

As shown by FIG. 6, the intensity of the electron emission from the MWNTs varied considerably, unlike that of the coated nanotubes. A comparison with the results of FIG. 4 show that the coated samples exhibited considerably less fluctuation in the electron emission.

EXAMPLE 6

Figure 7:
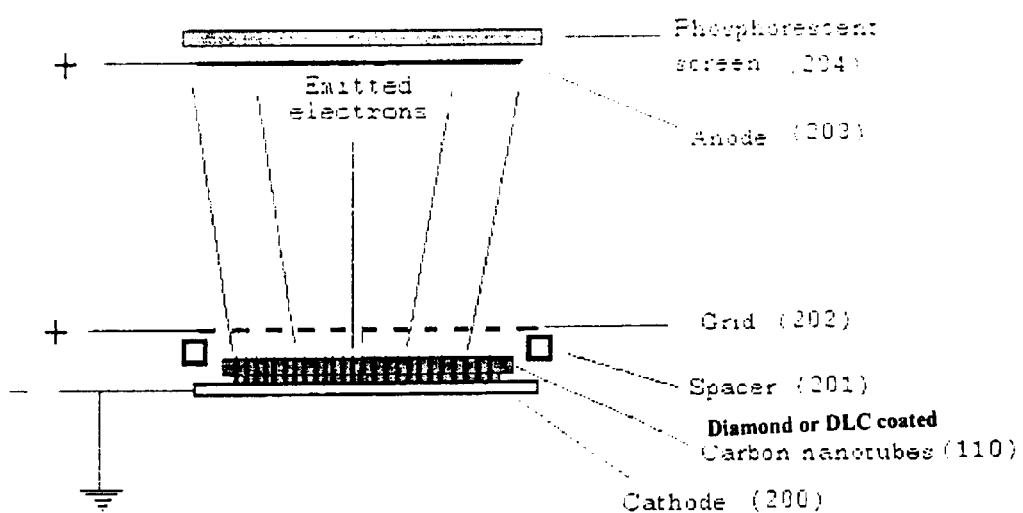
FIG. 7 is a schematic representation of the cross-section of CRT light emitting element comprised of electron emitting cathode comprised of nanotubes coated with diamond or diamond-like carbon, in accordance with the present invention.

A cold field electron emission having a nanotube coated with diamond or diamond-like carbon embodied in a CRT lighting element according to the present invention is illustrated in FIG. 7 was constructed as follows. A sample of the nanotube produced in accordance with the method and coated with diamond or diamond-like carbon, as produced according to Example 1, is directly glued onto a stainless steel plate (cathode 200 and coated carbon nanotubes 110 of a CRT) by using a conductive silver paste and baked at 450° C. in air to cure the silver paste. The cathode is covered with a control grid electrode (202). The cathode (200) and the control grid (202) are separated by a fixed distance using ceramic spacer (201). The distance between the tips of the coated nanotube and the grid is 0.2 mm.

A phosphor screen (204), being an anode, is printed on the inner surface of a front glass plate and backed with an aluminum film (203), with 100–150 nm in thickness, to give electrical conductivity. The described CRT structure is enclosed within a vacuum tube, (not illustrated in FIG. 19) and has a transparent glass wall to permit light to be emitted from the phosphor screen. After sealing the vacuum tube, getter material was flashed to attain a high vacuum in the order of 5×10$^{-08}$ Torr with the vacuum tube.

This CRT structure comprising the nanotube cathode, the anode and the control grid, are connected in a suitable electric circuit, in conventional manner well known in the art.

The coated nanotubes cathode of the CRT is grounded (0 V), and the control grid is biased to a positive voltage (in the range of 0.2–2.0 kV) to extract electrons from the cathode.

The above preferred embodiments and examples are given to illustrate the scope and spirit of the present invention. These embodiments and examples will make apparent to those skilled in the art other embodiments and examples. These other embodiments and examples are within the contemplation of the present invention.

Therefore, the present invention should be limited only by the appended claims.

What is claimed is:

1. A nanotube having a substantially uniform coating of diamond or diamond-like carbon, said coating of the nanotube having a thickness ranging from about 10 nm to about 100 nm.

2. The nanotube according to claim 1 wherein the coating thereon ranges from about 20 to about 50 nm.

3. The nanotube according to claim 1 wherein the nanotube is coated with diamond.

4. The nanotube according to claim 3 wherein the grain size of the diamond ranges from about 20 to about 60 nm.

5. The nanotube according to claim 1 wherein the nanotube is coated with carbon like diamond.

6. The nanotube according to claim 1 which is a multi-walled nanotube.

7. The nanotube according to claim 1 which is a single walled nanotube.

8. The nanotube according to claim 1 which is a double walled nanotube.

9. A nanotube as defined in claim 1 wherein the diamond or diamond-like carbon is comprised essentially of diamond produced fullerenes.

10. A nanotube as defined in claim 1 wherein the diamond or diamond-like carbon is comprised essentially of diamond produced by the vapor deposition of fullerenes.

11. A field emission cathode in a electron field emitter comprised of a substrate, carbon nanotubes coating the substrate and a substantially uniform coating of diamond or diamond like carbon on the nanotubes, said diamond or diamond-like carbon in said coating having a negative electron affinity the thickness of the coating on the nanotube being sufficient to prevent evaporization of carbon from the cathode during operation as an electron field emitter.

12. The field emission cathode according to claim 11 wherein a binder is additionally present and mixed with said nanotubes.

13. The field emission cathode according to claim 11 wherein the thickness of the diamond or diamond-like coating on the nanotube ranges from about 10 nm to about 100 nm.

14. The field emission cathode according to claim 13 wherein the thickness of the diamond or diamond-like coating on the nanotube ranges from about 20 to about 50 nm.

15. The field emission cathode according to claim 11 wherein the nanotubes are coated with diamond.

16. The field emission cathode according to claim 15 wherein the grain size of the diamond ranges from about 20 to about 60 nm.

17. The field emission cathode according to claim 11 wherein the nanotubes are coated with diamond-like carbon.

18. The field emission cathode according to claim 11 wherein the nanotubes are multi-walled.

19. The field emission cathode according to claim 11 wherein the nanotubes are single walled.

20. The field emission cathode according to claim 11 wherein the nanotubes are double walled.

21. A cathode ray tube having the field emission cathode of any one of claims 11–20.

22. A field emission cathode as defined in claim 11 wherein the diamond or diamond-like carbon is comprised essentially of diamond produced from fullerenes.

23. A field emission cathode as defined in claim 11 wherein the diamond or diamond-like carbon is produced by the vapor deposition of fullerene.

24. A method of enhancing the electron field emission from an electron field emitter having a cathode comprised of carbon nanotubes coating a substrate, said method comprising substantially uniformly coating the nanotube with diamond or diamond-like carbon, the thickness of the coating on the nanotubes being sufficient to prevent the evaporazation of carbon from the cathode during operation of an electron field emitter.

25. The method according to claim 24 wherein the thickness of the diamond or diamond-like coating on the nanotubes ranges from about 10 nm to about 100 nm.

26. The method according to claim 25 wherein the thickness of diamond or diamond-like coating on the nanotube ranges from about 20 nm to about 50 nm.

27. The method according to claim 24 wherein the nanotubes are coated with diamond.

28. The method according to claim 27 wherein the grain size of the diamond ranges from about 20 nm to about 60 nm.

29. The method according to claim 28 wherein the thickness of the coating ranges from about 10 nm to about 100 nm.

30. The method according to claim 29 wherein the thickness of the coating ranges from about 20 nm to about 50 nm.

31. The method according to claim 24 wherein the nanotubes are single walled.

32. The method according to claim 24 wherein the nanotubes are double walled.

33. The method according to claim 24 wherein the nanotubes are multi-walled.

34. A method for retarding the evaporation of carbon from an electron field emitter containing a cathode in which the cathode is comprised of carbon nanotubes, which method comprises substantially uniformly coating the nanotubes with either diamond or diamond-like carbon, in an amount sufficient to prevent the evaporation of carbon from the cathode.

35. The method according to claim 34 wherein the thickness of the diamond or diamond-like coating on the nanotubes ranges from about 10 nm to about 100 nm.

36. The method according to claim 35 wherein the thickness of diamond or diamond-like coating on the nanotube ranges from about 20 nm to about 50 nm.

37. The method according to claim 34 wherein the nanotubes are coated with diamond.

38. The method according to claim 37 wherein the grain size of the diamond ranges from about 20 nm to about 60 nm.

39. The method according to claim 38 wherein the thickness of the coating ranges from about 10 nm to about 100 nm.

40. The method according to claim 39 wherein the thickness of the coating ranges from about 20 nm about 50 nm.

41. The method according to claim 34 wherein the nanotubes are single walled.

42. The method according to claim 34 wherein the nanotube is double walled.

43. The method according to claim 34 wherein the nanotubes are multi-walled.

44. The method of claim 34 wherein the diamond or diamond-like carbon is comprised essentially of diamond produced from fullerene.

45. The method of claim 34 wherein the diamond or diamond-like carbon is produced by the vapor deposition of fullerene.

46. A method of forming a field emission cathode structure comprising a substrate having a nanotube field emission cathode affixed thereto, said method comprises coating the field emission surface of said carbon nanotube field emission cathode with a diamond or diamond-like carbon having a negative electron affinity, the thickness of the coating on the nanotubes being sufficient to prevent evaporation of carbon from the cathode.

47. The method of claim 46 wherein the electron field emitter is a CRT.

48. The method according to claim 46 wherein the thickness of the coating on the surface of said nanotube field emission cathode ranges from about 10 nm to about 100 nm.

49. The method according to claim 48 wherein the coating on the surface of said nanotube field emitter cathode ranges from about 20 nm to about 50 nm.

50. A method of forming a field emission cathode structure comprising a substrate having a nanotube field emission cathode affixed thereon, wherein said nanotube is affixed to the substrate by depositing the nanotube on the substrate, during the process of forming the nanotube in a carbon vaporizing process wherein the nanotube is formed by condensation of vaporized carbon in a nanotube forming atmosphere prior to its deposition on the substrate, said process comprising coating the nanotube with a substantially uniform coating of a diamond or diamond-like carbon, the thickness of the coating ranging from about 10 nm to about 100 nm.

* * * * *